MICROWAVE PHASE LOGIC CIRCUITS

Filed June 30, 1961 4 Sheets-Sheet 1

INVENTOR
FRANK B. HARTMAN
BY Joseph C. Redmond Jr.
ATTORNEY

PUMP DISTRIBUTION SYSTEM

April 26, 1966 F. B. HARTMAN 3,248,556

MICROWAVE PHASE LOGIC CIRCUITS

Filed June 30, 1961 4 Sheets-Sheet 3

FIG. 6
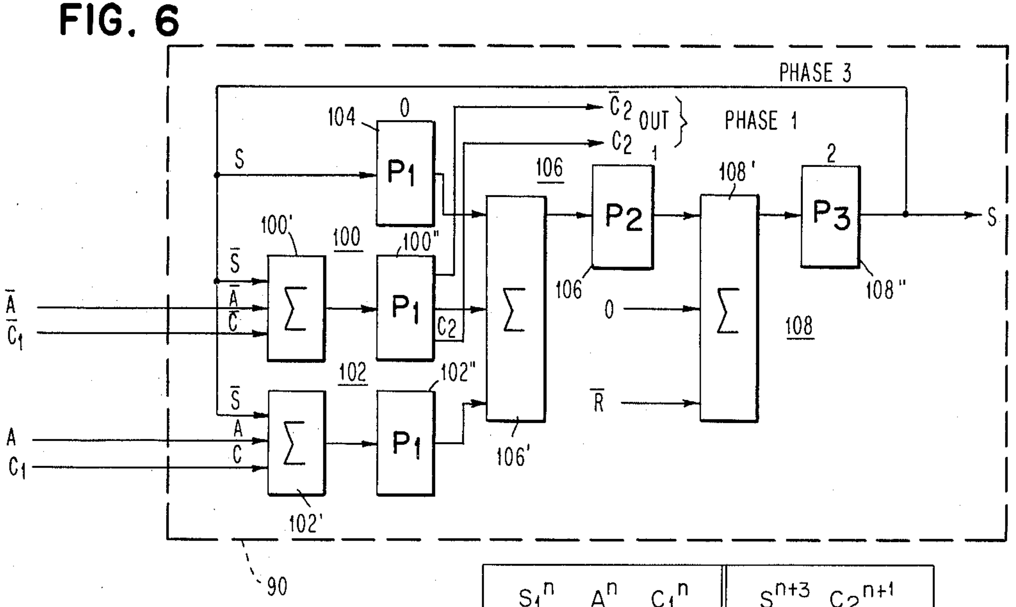
FIG. 6A
| $S_1^n$ | $A^n$ | $C_1^n$ | $S^{n+3}$ | $C_2^{n+1}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |
FIG. 7
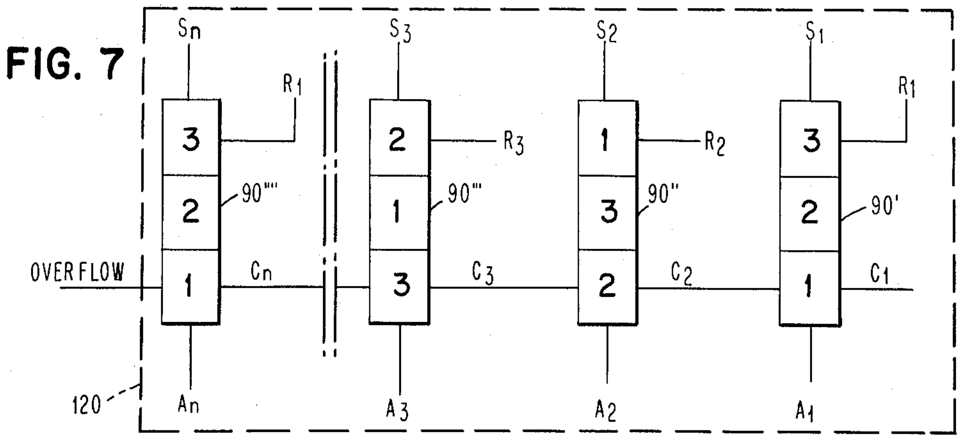

United States Patent Office 3,248,556

Patented Apr. 26, 1966

3,248,556

MICROWAVE PHASE LOGIC CIRCUITS

Frank B. Hartman, Poughkeepsie, N.Y., assignor to International Business Machines Corporation, New York, N.Y., a corporation of New York Filed June 30, 1961, Ser. No. 121,029

6 Claims. (Cl. 307—88)

This invention relates to switching circuits and more particularly to switching circuits employing multi-phase stable devices in a microwave phase logic system.

A multi-phase stable device may be defined as a device capable of oscillating in some frequency which may be a subharmonic of an exciting frequency and which is capable of providing different output wave forms distinguishable from one another by a difference in phase relationship. One particular form of such a device is one which, when triggered or switched, provides either a first or a second output waveform distinguishable from each other, the waveforms being distinguished with respect to one another by an angular phase displacement of 180 degrees. A particular example of one form of a multi-phase stable device as implemented in logical circuits capable of use in data processing systems is shown by J. Von Neuman in U.S. Patent 2,815,488, issued December 3, 1957, of common assignee herewith, and further described in an article entitled, "A New Concept in Computing," by R. L. Wittington, Proceedings of the IRE, vol. 47, April 1959, pages 516 to 523.

In the prior arts switching circuits exemplified by the Von Neuman patent, one form of a multi-phase stable device is employed as the basic element and is known as a subharmonic parametric or phase locked oscillator which is capable of providing distinct outputs arbitrarily designated 0 and 1. Such circuits employ a carrier system which is modulated in three phases to transfer information from a first line of phase locked oscillators to a second line of phase locked oscillators in a first and second modulation phase relationship, respectively. Modulation of the carrier accomplishes an insured forward transfer of the information and permits low power requirements on the part of an information signal to switch an oscillator from one to another stable state. When combinations of phase locked oscillators are arranged in a system, it is desirable to have a basic building block circuit which may be conveniently adapted to perform a variety of useful computer functions, for example, triggers and adders. Such a circuit should provide fan-in and fan-out capabilities that compare favorably with other technologies. Also, the circuit should be suitable for both AND/OR functions by convenient modifications thereto. With such a circuit available, the design and manufacture of microwave phase logic computers will be readily facilitated.

A general object of the present invention is a building block circuit for a microwave phase logic system.

One object is the combination of at least two building block circuits in a flexible microwave phase logic circuit.

One object is a microwave sequential logic circuit employing a plurality of basic building block circuits.

Another object is a microwave binary trigger circuit based upon a plurality of building block circuits.

Still another object is a binary adder based upon a plurality of building block circuits.

These and other objects are accomplished in accordance with the present invention, one illustrtaive embodiment of which comprises a microwave linear summing network adapted to receive a plurality of inputs of the same amplitude and modulation phase and provide a single output to a non-linear circuit element, typically a phase locked oscillator. The output signal from the linear summing network to the phase locked oscillator is the weighted sum of the electric field inputs to the summining network and induces oscillator operation that agrees in phase with the majority of the signal inputs to the linear summing network. Conveniently, the fan-in signals to the summing network may be selected to provide an output signal from the oscillator that represents an AND/OR function. Fan out signals are provided at a plurality of terminals for the oscillator. Inversion signals are easily obtained from such a circuit by judiciously selecting the proper length of transmission line between circuits, such that the output signal at one stage will appear in inverted form at the next stage. Thus, the combination of the linear summing network and phase locked oscillator provides all necessary logic functions to form a basic building block circuit that may be combined in various arrangements to perform all computer functions. One useful computer function is a flip-flop comprising at least one AND and one OR circuit which receive the same pump signal, suitable bias signals, a set of independent input signals and inverted output signals to provide output signals to a second building block circuit, the latter also receiving a delayed output signal to provide an output signal corresponding to the majority of the input signals. The output signal is also supplied to a phase locked oscillator which receives a third pump signal and cooperates with a transmission line to provide inverted output signals to the AND/OR circuit. The output of the flip-flop is dependent upon the independent input signals designated K and J and the instant of time referred to since the output signal is stored in the circuit as a third variable. For any pump signal the output signal is given by the majority function $Q^{n+1}=[Q[\overline{Q},\overline{K},1][\overline{Q},\overline{J},0]]^n$ where $Q^{n+1}$ is the output signal from the circuit, Q the stored signal, $\overline{Q}$ the stored signal in inverted form, $\overline{K}$ and $\overline{J}$ the input signals in inverted form, "1" and "0" bias signals to the circuit, $n$ is an integer designating the modulation cycle, and the brackets designate the majority function.

One feature of the present invention is a microwave phase logic building block adapted to receive three or more input signals having the same amplitude and modulation phase and provide an output signal to a non-linear oscillator which locks in on the phase of this output signal and provides either a binary "1" or a binary "0" output.

Another feature is a microwave phase logic circuit including at least two basic circuits, each basic circuit including a microwave linear summing network and a non-linear oscillator, each basic circuit being adapted to perform a majority function logic operation on a plurality of $n$ independent signals where $n$ is an odd integer carrier signal means, means for applying phase modulated carrier signals to each non-linear oscillator to transfer the signal inputs unidirectionally among the oscillators and means interconnecting outputs of various basic circuits to enable the combination of basic circuits to perform a sequential switching operation.

Another feature is a microwave phase logic AND circuit and a microwave phase logic OR circuit each adapted to receive a first pump signal, bias signals, independent signals, inverted output signals and provide input signals to a second circuit adapted to receive a second pump signal, a delayed output signal from a source modulated by a third pump source, the combination of circuits providing a majority organ microwave phase logic flip-flop.

Still another feature is a flip-flop circuit adapted to receive more than one set of independent input signals, the circuit comprising a plurality of building blocks each including a linear summing network and a phase locked oscillator and each adapted to receive a set of independent signals suitable for changing the output of the circuit from one stable condition to the other.

The foregoing and other objects, features and advantages of the invention will be apparent from the following more particular description of the preferred embodiments of the invention, as illustrated in the accompanying drawings.

Figure 2:
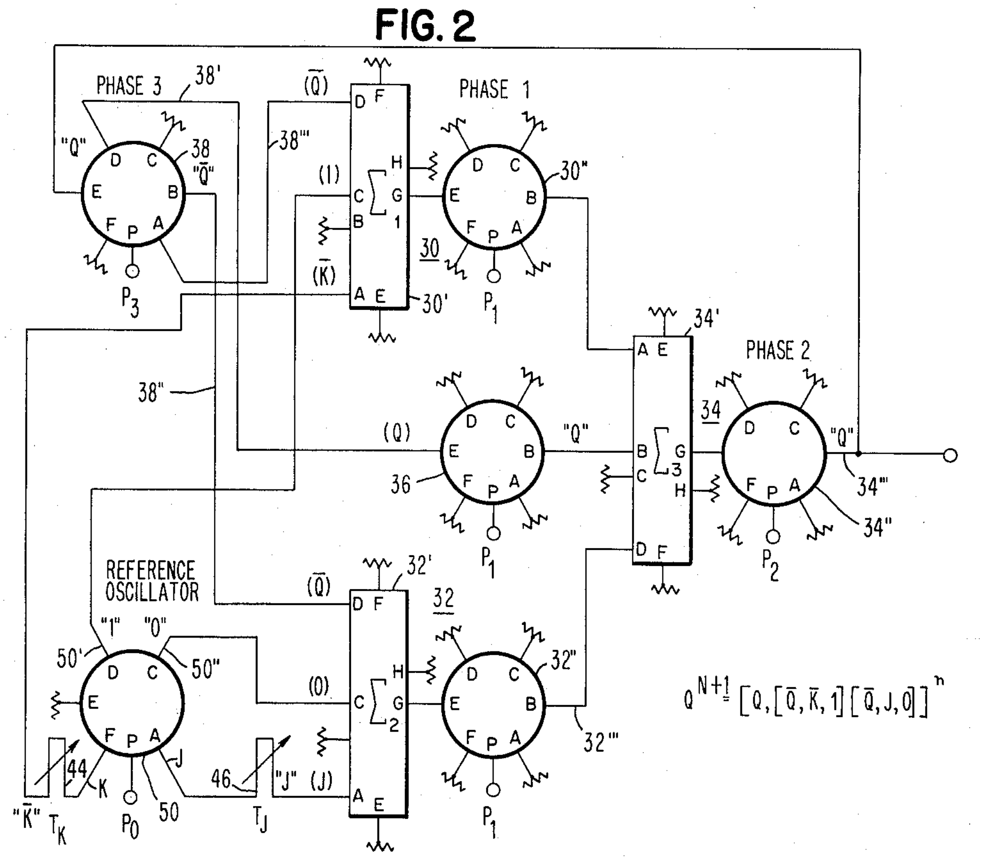
FIG. 2 is a schematic of a plurality of building blocks arranged in a microwave flip-flop operation.
Figure 4A:
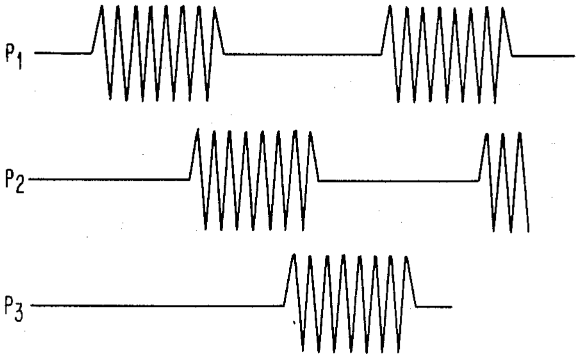
Figure 4B:
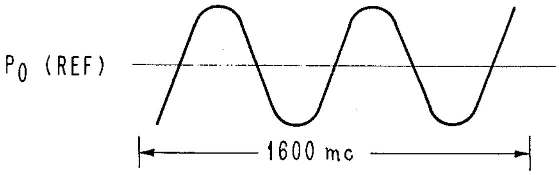
Figure 4C:
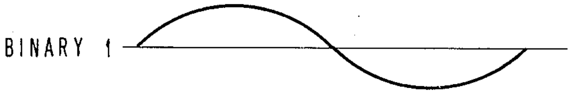
Figure 4D:
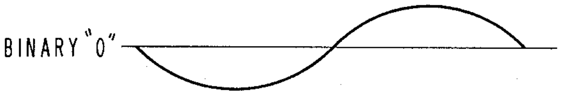

FIGS. 4A, B, C and D are modulated pump signals and carrier information signals supplied to the flip-flop of FIG. 2.

Figure 1:
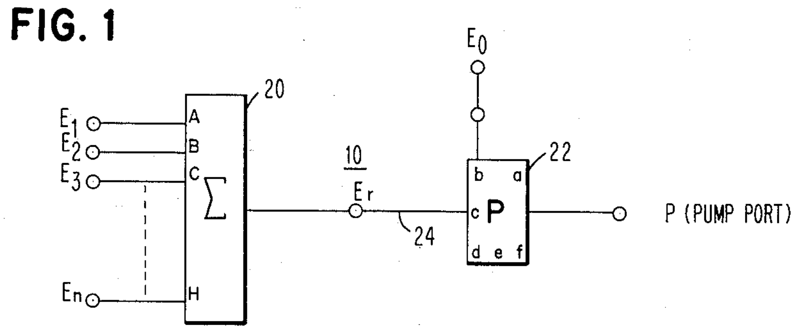
FIG. 1 is a schematic of one embodiment of a basic building block circuit comprising a linear summing network and a phase locked oscillator.
Figure 5:
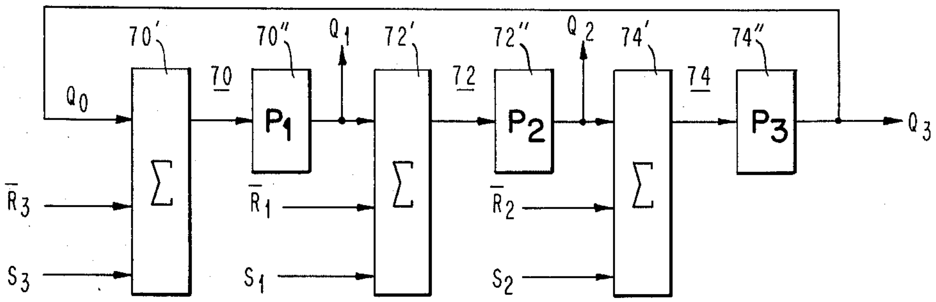

FIG. 5 is a binary flip-flop employing a plurality of building block circuits of the type shown in FIG. 1, each circuit being adapted to receive a plurality of input signals.

FIG. 6 is a plurality of building block circuits arranged on an adder to arithmetically combine two bits of data.

FIG. 6A is a tabulation of input and output signals associated with the adder shown in FIG. 6.

FIG. 7 is an adder circuit employing a plurality of unit adder circuits of the type shown in FIG. 6.

Referring to FIG. 1, a microwave phase logic block 10 includes a linear summing network 20 adapted to receive a plurality of inputs $E_1, E_2 \ldots E_n$ and a subharmonic parametric or phase locked oscillator 22 of the type described in the Von Neuman patent referred to hereinbefore, the network and oscillator being suitably interconnected by transmission line means 24. Briefly, the oscillator 22 has a plurality of electrical terminals *a* through *f* plus a pump terminal P, the latter receiving a pump signal having a suitable frequency. For purposes of the present invention, a frequency of the order of 1600 megacycles was selected, but such a frequency is not intended to limit the invention. The 1600 megacycles signal was employed because it was convenient to obtain a suitable oscillator for that particular frequency.

With regard to the oscillator, a resonant loop is established therein such that the pump frequency is converted to a frequency of one half the input frequency or 800 megacycles. An input circuit and an output circuit are connected to the resonant loop through two of the terminals *a* through *f*. The terminals selected are a known wave length apart so that an input signal could appear in complemented form at the output port, if desired. The other ports are suitably terminated to prevent any output signal from the oscillator. More than one terminal, however, may be employed to provide an output signal, if desired.

A characteristic of the phase locked oscillator is that an input stimulus applied to the resonant loop at the proper point and in proper phase causes the resonant circuit to lock in with the phase of the input signal and remain in this condition. When a second input signal displaced 180 degrees in phase from the first input signal is applied to the resonant loop after the pump has been turned off and reapplied, the output signal will be 180 degrees with respect to the original phase condition. Thus, the input signals can induce the oscillator into phase conditions indicative of a binary "1" or "0" operation. Connecting the proper lengths of transmission line to the several terminals permits both true and complement signals o fthe input signal to be generated by the oscillator.

The linear summing network is composed of microwave couplers, for example, hybrid rings or branch line couplers, the latter being found to be the preferable element for the present invention. The branch line couplers are of conventional design, for example, those illustrated in "Sanders Associates Handbook of Tri-Plate Microwave Components," page 78, published 1956. The network comprises at least three two-branch line couplers suitably interconnected to provide four input ports and a single output port. Normally, the summing network combines the 800 megacycle output signals from a plurality of oscillators. Each branch line coupler is adapted to provide sum and difference signals for two input microwave signals. When suitably interconnected, an output signal can be provided by the coupler which is the sum of the 800 megacycle input signals. The output signal when applied to the oscillator controls the output phase thereof in accordance with the principles described in the Von Neuman patent.

The combination of the linear summing network and the phase locked oscillator cooperate to form a majority organ logic element. This may be seen by considering the summing network which forms an output signal $E_r$ proportional to the sum of the steady state input signal $E_1, E_2 \ldots E_n$, each signal having one of two signal phase values (0 degree or 180 degrees). Such a signal is expressed by the equation $E_r=K(E_1+E_2 \ldots E_n)$ where K is a constant of proportionality. Limiting the signals to 0 and 180 degree phase relations permits both to be assumed as real-valued for the purpose of computing $E_r$. Since the resultant output signal is also required to be limited to a two-valued signal so that the oscillator may be locked into one or the other signal phase, it is apparent that the number of input signals must be an odd integer. An even number of input signals could produce a zero sum and no change in oscillator output with a resultant interruption in logical operation on the part of the combination of the summing network and the oscillator. For an odd number of inputs, however, $E_r$ will be equal to the phase of a majority of the input signals and no interruption in logic can occur. Thus, the circuit shown in FIG. 1 is a majority organ logic element for *n* independent variables where *n* is an odd integer. Various subfunctions can be obtained, as will be pointed out hereinafter, by combining or biasing inputs.

One use of the basic circuit element shown in FIG. 1 is in combination with other elements to form various combinatorial and sequential logic circuits. The number of oscillators required in each logic circuit is at least three for information transfer reasons. The elements are bidirectional in nature, that is, information flows in both directions therefrom. To limit the flow of information in one direction, the pump signals applied to the logic elements are modulated, the modulated pump signals being in a three phase relationship as shown in FIG. 4. As a result, when information is to be transferred from a logic block, the modulated pump signals form a stepping action to transfer the information from one element to the next in synchronism with the stepping action. Thus, information transfer proceeds unidirectionally as is required in information handling systems. A more detailed description of the pump signal as well as bias signals required for certain logic circuits will be given in connection with FIGS. 3 and 4.

Referring to FIG. 2, a microwave phase sequential logic circuit operating as a flip-flop comprises a first logic circuit 30 including a linear summing network 30' and an oscillator 30''. The circuit 30 is suitably connected to receive first, second and third input signals ($\overline{Q}$, 1, $\overline{K}$) to be summed and a first modulated pump frequency ($P_1$). The input signals appearing at the summing network, for reasons previously indicated, have a frequency that is half the carrier frequency of the modulated pump signal. Such signals will be hereinafter designated as stimuli or information signals since they affect the operation of the oscillator. One of the information signals is unchanging and has a binary "1" designation. The other signals ($\overline{Q}$ and $\overline{K}$) appearing at the summing network 30′ are independently variable, that is, they may be either a binary "1" or a binary "0." $\overline{Q}$ is defined as the output signal stored in the circuit in inverted form whereas $\overline{K}$ is an independent input signal to the circuit in the inverted form. Inversion of the Q and K signals is accomplished by controlling the length of transmission line between oscillators. Since the combination of the network and the oscillator is a majority organ, an output 30‴ therefrom will be a binary "1" unless both the independent variable inputs are a binary "0." Thus, the majority organ 30 performs as the conventional OR circuit found in other technologies.

A second logic block 32 having a summing network 32′ and an oscillator 32″ is also adapted to receive the first pump frequency $P_1$ and three input signals, ($\overline{Q}$, 0, J) one of which is a binary "0" signal. The other two input signals ($\overline{Q}$ and J) are independently variable where $\overline{Q}$ has been previously defined and J is an independent input signal. For reasons previously indicated, it will be apparent that an output 32‴ from the oscillator 32″ will be a binary "0" unless both independent variables are a binary "1." Thus, the circuit 32 functions as the conventional AND circuit found in other technologies.

Also included in the flip-flop is a third basic circuit 34 having a summing network 34′ and oscillator 34″, the latter receiving the second modulated pump signal $P_2$. The summing network is adapted to receive the outputs from the OR circuit 30 and the AND circuit 32. The summing network 34′ also receives a third input signal Q from an oscillator 36 which receives the same pump frequency or $P_1$ as the oscillators 30″ and 32″. The input signal to the oscillator 36 is the same as that appearing at output 34‴ of the oscillator 34″ but delayed by still another oscillator 38 operating on a third pump frequency $P_3$. The combination of signals applied to the network 34′ permits the oscillator 34″ to provide an output signal which is the same as that normally appearing (Q) unless the AND circuit and the OR circuit provide like signals whereupon the output of the oscillator 34″ changes to that of the AND/OR circuit.

The oscillator 38 previously referred to receives the output signal 34‴ and provides output signals 38′, 38″ and 38‴ to the AND/OR circuits in inverted form and to the oscillator 36 in true form. The oscillator 38 in effect stores the output signal and provides the third variable to the flip-flop circuit to enable majority logic to be performed in providing an output.

The binary "1" and "0" bias signals necessary for the AND/OR circuit are supplied from a reference oscillator 50 which receives an unmodulated pump frequency $P_0$. Output signals 50′ and 50″ are 180 degrees displaced with respect to each other thereby representing a binary "1" and "0," respectively. Also developed at the reference oscillator are information signals K and J which are provided to the AND/OR circuits as independent variables. Suitable microwaves means (adjustable lines) 44 and 46 are associated with the information signals K and J, respectively, to change the phase of one or the other or both as the case may be. As a result, the signals K and J may be either a binary "1" or "0." The transmission line between the reference oscillator and the OR circuit is selected to be of a length such that the K signal appears in inverted form with respect to the same signal appearing at the reference oscillator. It should be noted that the input signals to the AND/OR circuit may be signal sources other than those originating at the reference oscillator. The signals could be from another flip-flop or logic circuit instead of from the reference oscillator. In any case, the input signals are variable in nature. The reference oscillator was selected solely for reasons of convenience only as a means for generating the variable input signals.

Figure 3:
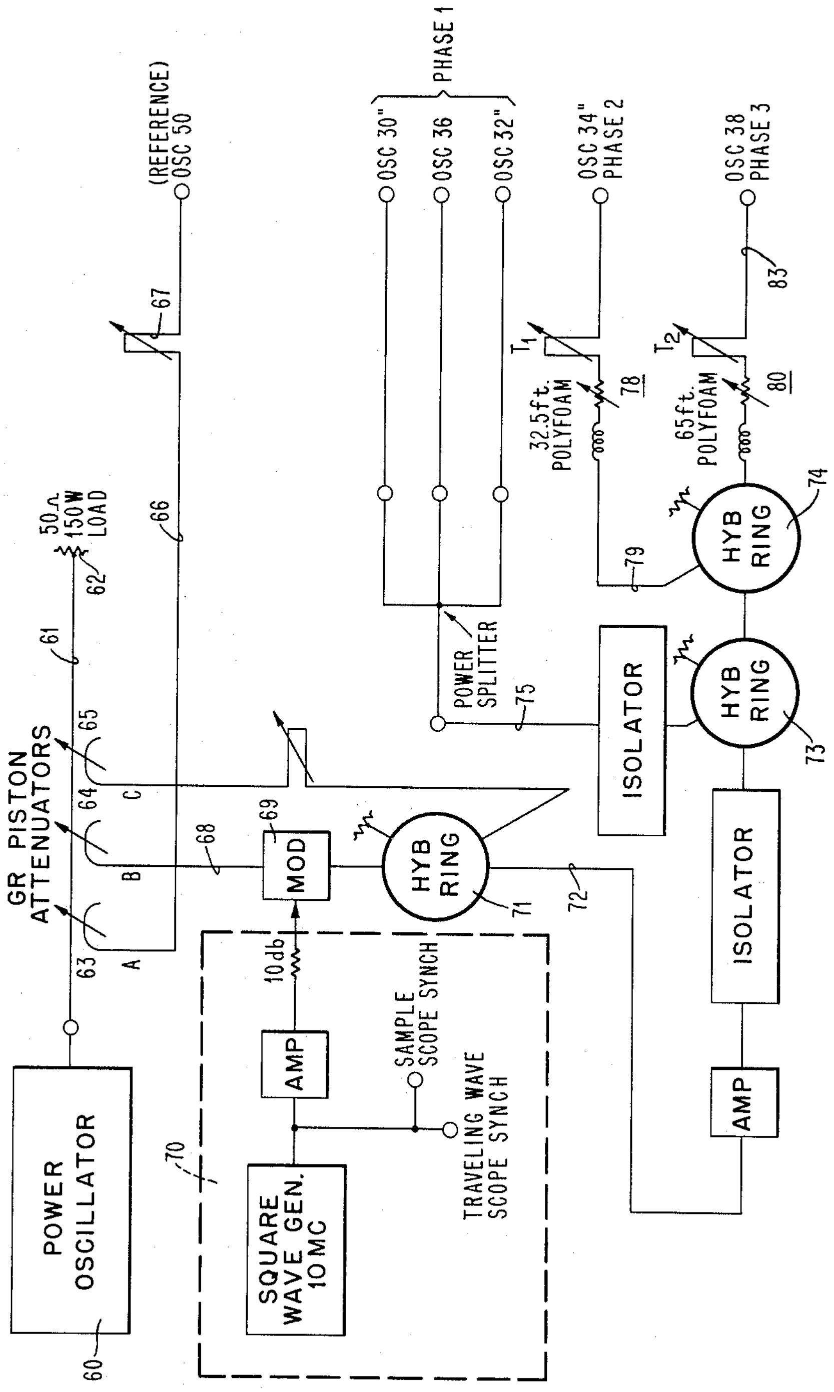
FIG. 3 is a schematic of the pump distribution system for energizing the circuit of FIG. 1.

Before describing the operation of the flip-flop, it appears in order to describe the pump distribution system shown in FIG. 3 and the pump and bias signals shown in FIGS. 4A, B, C and D, which energize the oscillators included in the flip-flop. The central power source for the system is any commercially available oscillator 60 providing microwave frequency of output. For purposes of the present invention, the oscillator selected provides an output signal at 1600 megacycles on a transmission line 61 suitably terminated by a load impedance 62, one cycle of the fundamental frequency being shown in FIG. 4B. Connected to the oscillator output are conventional directional couplers 63, 64 and 65 capable of independent operation. The coupler 63 provides a reference carrier signal $P_0$ (see FIG. 4B) through a transmission line 66 having well-known microwave means 67 usually referred to as adjustable lines for controlling the phase of the carrier signal. Coupler 64 is connected to a transmission line 68 which includes a modulator circuit 69 adapted to receive a square wave pulse from a suitable pulsing means 70. The output from the modulator 69 is a modulated carrier pulse signal $P_1$ (see FIG. 4A) that is supplied to a conventional hybrid ring 71 for purposes of improving the modulating factor of the carrier pulse. Also connected to the hybrid ring is the output from the coupler 65. The inputs to the hybrid ring are so arranged that the difference between the coupler 65 and the modulator 64 signals is such that little or no carrier signal appears between the modulated pulse signal. Consequently, the output signal from the hybrid ring which is applied to a transmission line 72 appears as a 100 percent modulated wave. The transmission line is connected to a hybrid ring 73 for signal distribution purposes, the signal appearing on the line being suitably amplified and isolated from the source 60 before reaching the ring 73. Cooperating with the ring 73 is a hybrid ring 74, the combination developing three modulated pump signals ($P_1$, $P_2$, $P_3$) displaced in a three phase arrangement for reasons previously described.

The hybrid rings are of conventional construction, the ring 73 providing an output on transmission line 75 which is taken as the reference modulated pump signal. The signal on the line 75 is split three ways to serve selected oscillators in the flip-flop. The amplitude of the reference signal can be adjusted by the couplers 64 or 65. The ring 73 also provides an output to the ring 74 from which second and third pump signals ($P_2$ and $P_3$) are derived, the second and third pump signals being displaced with respect to the reference modulated pump signal, as shown in FIG. 4A.

A polyfoam coaxial cable and attenuator 78 adjusts the phase of the second pump signal on a transmission line 79 to be properly related to and at the same amplitude as the reference modulated pump signal $P_1$ appearing on the line 75. Another polyfoam coaxial cable and attenuator 80 adjusts the phase of the third pump signal on transmission line 83 to be at the same amplitude as the reference modulated pump signal $P_1$. Thus, the transmission lines 75, 79 and 83 are all in phase and at the same amplitude, a requirement necessary to operate the oscillators of the flip-flop shown in FIG. 2. The signals on the transmission lines 75, 79 and 83 are also adjusted by suitable means to have the same carrier phase as that appearing on the transmission line 66. When the carrier phases are all the same, the transmission line 66 is connected to the reference oscillator 50 and the modulated pump signals ($P_1$, $P_2$, and $P_3$) on the lines 75, 79 and 83 are supplied to the oscillator 30″, 32″, 36, 34″ and 38, respectively.

Before operating the flip-flop it is also necessary to establish binary "1" and "0" bias signals. The bias signals are established at the reference oscillator 50 from the unmodulated carrier signal $P_0$ appearing on the transmission line 66. The characteristic of the reference oscillator is such that the signals appearing at the ports *d* and *c* are displaced 180 degrees relative to each other thereby establishing a binary "1" and "0" signals shown in FIGS. 4C and D. The signals are also at one half the frequency of the unmodulated pump $P_0$.

The independent variable signals K and J, respectively, are also developed at the reference oscillator. The K and J signals are matched to the binary "1" and "0" signals by the means 44 and 46, respectively. Suitable laboratory test equipment can be connected to the lines to confirm the matching. When the devices 44 and 46 have been set for a matching, a mark is placed on the devices 44 and 46 to record the position and the devices 44 and 46 reset to match the complements of the binary "1" and "0" signals. The complemented signal positions are also indicated on the devices 44 and 46 so that now independent signals can be provided to the flip-flop simply by setting the devices to the positions marked thereon.

The operation of the flip-flop will now be described assuming, of course, that the pump distribution system has been energized and aligned and the reference oscillator is providing proper binary "1" and "0" bias signals. Next, the independent input variables (K or J) are set to provide input signals to the flip-flop. When the K input signal has been set to a binary "0" and the J input has been set to a binary "1," the flip-flop operates to provide a binary "1" at the output of the oscillator 34''. This may be seen by considering the outputs from the AND circuit 32 and the OR circuit 30, the former being $\overline{Q}$ and the latter being a "1." The AND/OR outputs form the inputs to the summing network 34', the $\overline{Q}$ being cancelled by the Q input of the oscillator 36 which results in the binary "1" input being the output of the oscillator 34''. Resetting only the independent input signal J to a binary "0" results in the output signal Q (now a binary "1") being stored in the circuit. For such a setting the AND/OR outputs are "0" and "1," respectively. The "0" and "1" signals cancel each other at the circuit 34 so that the input Q is also the output. Thus, the output signal is the same as that appearing for the previous settings of the K and J signals.

Reversing the J and K signals from "1" and "0" to "0" and "1," respectively, results in a binary "0" output signal. For such a setting, the OR output is $\overline{Q}$, the inverse of the previous output signal and the AND output is a binary "0." In the circuit 34, $\overline{Q}$ is cancelled by Q, the previous output signal which results in the binary "0" signal from the AND circuit appearing as the output signal from the oscillator 34''. Thus, it can be seen that the "0"–"1" signals for K and J, respectively, turn on the flip-flop whereas the "1"–"0" signals for K and J, respectively, turn off the flip-flop. Setting both the J and K signals to a binary "0" stores the output signals in the flip-flop. Turning off the modulator 69 or letting an unmodulated pump signal be applied to all oscillators stops the flip-flop action and stores the last setting in the circuit.

One last setting of the independent input signals occurs when both are a binary "1" which results in the output signal alternating from one binary state to the other binary state so long as the input signals remain in this condition. Assuming that a binary "1" is stored in the circuit, J and K input signals of binary "1" result in an AND output signal of $\overline{Q}$ and an OR output of $\overline{Q}$ thereby causing the output signal to be $\overline{Q}$ or a binary "0" which is the opposite of the previous stored signal. The next cycle of operation, however, results in a binary "1" appearing at the output of the flip-flop. Again, the output from the AND/OR circuits is $\overline{Q}$ causing the output of the oscillator 34'' to be $\overline{Q}$ or a binary "0," the inverse of the previously stored signal conditions. The flip-flop continues to alternate between the binary "0" and "1" signal conditions so long as the K and J signals remain in the binary "1" or UP condition. This action of the flip-flop is equivalent to the well-know binary trigger action found in other technologies. Hence, the present circuit shown in FIG. 2 permits a single circuit to be employed in a dual capacity that is either as a flip-flop or a binary trigger.

Summarizing, the operation of the circuit can be described for any cycle or operation by the following equation: $Q^{n+1}=[Q[\overline{Q},\overline{K},1],[\overline{Q},J,0]]^n$ where $Q^{n+1}$ is the output signal from the circuit, $\overline{Q}$ the storage signal in inverted form, J an input signal in true form, "1" and "0" bias signals to the circuit, and $n$ an integer designating a modulating cycle of operation of the flip-flop. The brackets designate the majority function.

A second flip-flop available with the basic circuit element is shown in FIG. 5 . The second flip-flop is adapted to receive a plurality of independent input signals ($\overline{R}_1$ $S_1$, $\overline{R}_2S_2$, $\overline{R}_3S_3$) and provide an output $Q_1$, $Q_2$, $Q_3$, respectively, for each set of signals. Such a circuit finds use where the flip-flop has to be turned on or turned off from more than one phase.

Included in the flip-flop of FIG. 5 are three logic circuits 70, 72 and 74, each including a summing network 7$n'$ and an oscillator 7$n''$ where $n$ corresponds to the digit with which the oscillator and summing network are associated. Each summing network receives at least three input signals, two of the input signals, $R\phi$ and $S\phi$, being independently variable where $\phi$ is the modulated phase and the third signal being the output signal that is stored in the loop. The R input signal appears in inverted form for reasons more apparent hereinafter. As a result, an output signal $Q\phi$ will be supplied by each circuit element to the logic system associated therewith.

The flip-flop operation of each basic circuit is given by the relation $Q^{n+1'}=[Q,\overline{R},S]^n$ where $Q^{n+1}$ is the output signal corresponding to $Q\phi$, Q is the stored signal, provided R and S are the independent input signals previously described, $n$ is the cycle of operation, and the brackets designated the majority function. Thus when R and S are a binary "0" and "1," respectively, the output signal is a binary "1." When R and S are a binary "1" and "0," respectively, the output signal is a binary "0." The output signal for the other input signal conditions may be determined from the previously indicated relation.

The output signal appearing for the entire combination is given by $$Q^{n+3}=[[Q_1^n,\overline{R}_1^n,S_1^n],\overline{R}^{n+1},S_2^{n+1}],\overline{R}_3^{n+2},S_3^{n+2}$$

$Q^{n+3}$ is the new output signal from the circuit element 74 based upon the inputs to the circuit elements 70, 72 and 74.

$Q_1^n$ is the output signal stored in the circuit element 74.

$\overline{R}_1^n$ is the input signal, in inverted form to circuit element 70.

$S_1^n$ is the input signal to circuit element 70.

$\overline{R}_2^{n+1}$ is the input signal to circuit element 72.

$S_2^{n+1}$ is the input signal to circuit element 72.

$\overline{R}_3^{n+2}$ is the input signal in inverted form to circuit element 74.

$S_3^{n+2}$ is the input signal to circuit element 74.

$n$ is an integer designating the modulation phase.

The basic circuit element is also capable of being arranged into a binary adder circuit 90 shown in FIG. 6. The adder circuit, shown in FIG. 6, comprises basic circuits 100, 102 and an oscillator 104 receiving the first pump frequency $P_1$. A second basic circuit 106 receives the output signals from the oscillators 100', 102' and 104 and provides an output signal to a third circuit 108, the circuits 106 and 108 receiving the second and third pump frequencies ($P_2$ and $P_3$), respectively. An output signal S from the circuit 108 is provided as an input signal S to the oscillator 104 and in inverted form $\overline{S}$ an input signal to the circuits 100 and 102. Also applied to the circuits 100 and 102 are augend signal A and carry signal $C_1$, the inverted form of these signals $\overline{A}$ and $\overline{C}_1$ being applied to the circuit 100 and the true form of these signal being applied to the circuit 102. Completing the signal input to the circuit of FIG. 6 are a binary "0" bias signal and a reset signal $\overline{R}$ which are applied to the circuit 108. An output carry signal $C_2$ is obtained from the output of the circuit 100 and applied to the circuit 106. The signal $\overline{C}_2$ is also obtained from circuit 100 for application to a subsequent adder stage as will appear hereinafter.

Operation of the circuit is initiated by aligning the modulation phases and establishing a binary "0" bias signal to the circuit 108. Thereafter a binary "0" augend and carry signals to both the circuits 100 and 102 and a binary "0" stored signal S results in the outputs from the circuits 100, 102 and 104 being a binary "1," a binary "0" and a binary "0," respectively. The output of 100 referred to above is labeled $C_2$. The circuit 106 receives the previous signals and provides a binary "0" as an output since the majority of the inputs is a binary "0." Thus, the signal appearing at the circuit 108 is a binary "0" since the majority of its inputs is also a binary "0." The output of circuit 100 (which is also a binary "0") is taken as an output of circuit 90.

A binary "1" at input A and a binary "0" at input $C_1$ appearing at the input terminal of circuit 90 provide a binary "1" S output and a binary "1" carry output $C_2$. This may be seen from the outputs of the circuits 100, 102, and 104 which are binary "1," a binary "1" and a binary "0" respectively, provided a binary "0" signal is stored in the adder. With these signals as an input, the circuit 106 provides a binary "1" output signal which is applied to the circuit 108 as an input. The bias signal and the reset signals also applied to the circuit 108 cancel each other which results in the input signal or binary "1" from the circuit 106 appearing as the output signal S from the circuit 108.

It will be evident that the circuit of FIG. 6 forms the sum signal as an Exclusive OR and provides the carry signal as the majority function of the input signals. For reasons of brevity, therefore, the description will omit the operation of the circuit for the remaining combinations of input signals. The generation of output signals for all combinations of input signals is summarized in FIG. 6A.

The circuit of FIG. 6 may be arranged into a binary adder 120 in the manner shown in FIG. 7 wherein each of the adder circuits 90 shown in FIG. 6 is indicated by a single square that designates the pump modulation phases 1, 2 and 3. With regard to the adder 90, it should be noted that the output $C_2$ is connected as one input to the next succeeding stage and a digit to be added $A_1 \ldots A_n$ thereto is the other input to the adder. The notable difference between the circuit of FIG. 6 and those shown in FIG. 7 is that the augend and carry signals are applied and taken from different phases for information transfer reasons. Thus, the augend and carry signals applied to adder 90' provide a sum signal at phase 3 and a carry signal at phase 1. The next stage of the adder, however, requires the augend and carry signals to be applied to phase 2 and the sum signal to be taken at phase 1. The carry signal is taken at phase 2. At the next stage in the adder, the input signals are applied to phase 3 and the sum signal is taken from phase 2. The carry signal is taken from phase 3 and applied together with an augend signal to a stage the same as the first stage of the adder where the sum and carry signals are taken at phase 3 and 1, respectively. Thus a chain of circuits of a type shown in FIG. 6 is built up to handle the quantity of digits desired to be automatically combined.

The operation of the adder shown in FIG. 7 is an extension of the adder described in FIG. 6 and will be omitted for reasons of brevity. Entry of data and detection of end of carry propagation signals in the adder of FIG. 7 is similar to that described in an article entitled, "Microprogramming," by R. J. Mercer which appeared in the Journal of the Association for Computing Machinery, vol. 44, No. 2, April 1957, pages 157–171.

Hence, the present invention has disclosed a basic building block which may be easily combined with similar circuits to construct sequential circuits, for example, flip-flops, triggers and adders which are all useful for computer systems. Conveniently, the basic building block may be modified by suitable bias signals or other means to perform AND/OR circuit operations as well as inversion. The linear summing network provides the building block with fan-in capabilities and the multiple output ports of the oscillator provide fan-out capabilities which are equivalent to that found in other technologies. The building blocks may be used over a wide range of frequencies which permits miniaturizations and high speed when the frequency is of the order of kilomegacycles. Thus, any desired microwave phase logic circuit can be easily designed and manufacture facilitated for data processing systems by the use of the basic circuit and combinations thereof disclosed in the present invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A microwave phase logic circuit comprising a set of independently variable signals designated K and J, a set of bias signals designated "1" and "0," respectively, a delayed signal Q, first and second majority function logic circuits and a first non-linear oscillator, means for supplying one modulated phase of a three phase modulated carrier to the first and second majority function circuits and the first non-linear oscillator as a pump frequency, means for supplying the complement of the K and Q signals plus the "1" signal to the first majority function circuit and the complement of the Q signal plus the J and "0" signals to the second majority function circuit and the Q signal to the first non-linear oscillator, a third majority function circuit responsive to output signals from the first and second majority function logic circuits and the first non-linear oscillator, means for supplying the second modulated phase to the second majority function circuit as a pump frequency, said third logic circuit providing an output signal defined by the majority relation $Q^{n+1}=[Q[\overline{Q},\overline{K},1][\overline{Q},J,0]]^n$ where Q is the delayed signal, $\overline{Q}$ is the inverse of the delayed signal, $\overline{K}$ the inverse of the independently variable signal K, J one of the independently variable signals, "1" is one bias signal, "0" the other bias signal, *n* is the modulation phase, and the brackets define majority function logic, and means for supplying the output signal $Q^{n+1}$ to a second non-linear oscillator which receives the third phase of the modulated carrier as a pump frequency, said second non-linear oscillator delaying the output signal and providing the delayed output signal as Q and $\overline{Q}$ to the majority function circuits receiving the first phase of the modulated carrier.

2. A microwave phase logic circuit comprising a three phase modulated pump system having first, second and third pump frequencies, a first and second majority function logic circuits and a first non-linear oscillator all receiving the first modulated phase of the three phase modulated carrier frequency as a pump frequency, a first set of independently variable signals supplied to the first circuit in true form and to the second circuit in complement form, delay signal means responsive to an input signal providing a delayed signal to the first non-linear oscillator in true form and to the first and second majority function circuits in complement form, said first and second majority function logic circuits and the first non-linear oscillator providing inputs to a third majority function logic circuit, said third majority function logic circuit receiving the second phase of the three phase modulated carrier as a pump frequency and providing an output to a fourth majority function logic circuit receiving the third phase of the three phase modulated carrier as a pump frequency, means for generating a bias signal and a reset signal, said fourth majority function logic circuit responsive to the bias signal, the third majority function logic circuit output and the reset signal to provide an output which is the majority function of the input signals to the first and second majority function logic circuits, said fourth majority function logic circuit further providing an output which is the input to delay signal means.

3. The microwave phase logic circuit defined in claim 2 wherein the second majority function logic circuit provides true and complement outputs for the input signals supplied thereto, said complement signal and the output from the fourth majority function logic circuit being carry and sum signals, respectively for the independently variable input signals supplied to the first and second majority function logic circuits.

4. A microwave phase logic circuit comprising a three phase modulated pump system having first, second and third pump frequencies, first and second majority logic function circuit elements and a first non-linear oscillator, each majority logic function circuit element including a non-linear oscillator, the first modulated phase of the pump system being supplied to all non-linear oscillators, means for generating bias signals, delay signal means responsive to the third modulated pump frequency and an input signal, independently variable signal means, the first and second majority logic function circuit elements being responsive to the independent signals, the bias signals and the delay signal to provide outputs which represent a majority OR and AND logic operation, respectively, a third majority function logic circuit element responsive to the outputs of the AND and OR circuits, the non-linear oscillator and the second phase of the three phase modulated pump system, said third majority function logic circuit element providing an output which corresponds to the delay signal unless the AND and OR output signals are alike and opposite to the delay signal whereupon the output changes to the output of the AND and OR circuits, said majority logic circuit element further providing an output which is applied as the input to the delay signal means.

5. A microwave phase trigger circuit comprising a three phase modulated pump system having first, second and third pump frequencies, first, second and third majority function logic circuits, each majority function logic circuit including a non-linear oscillator, the first, second and third non-linear oscillators being excited by the first, second and third modulated pump frequencies, respectively, means generating first, second and third sets of independently variable signals, each set of independently variable signals adapted to turn off the trigger circuit, each logic circuit providing an output signal in response to a set of independently variable signals and the output from a different majority function logic circuit, the output from the third majority function logic circuit being designated a stored signal, the first majority function logic circuit responsive to the third set of independently variable signals and the stored signal, said second majority function logic circuit receiving as an input the first set of independently variable input signals, and the output from the first majority function logic circuit, said third majority function logic circuit receiving as an input the second set of independently variable input signals and the output from the second majority function logic circuit, said third majority function logic circuit changing the output and stored signal for preselected combinations of the independently variable input signals and stored signal.

6. The trigger as defined in claim 5 wherein the first, second and third independently variable input signals are designated $\bar{R}_3$, $S_3$, $\bar{R}_1$, $S_1$; $\bar{R}_2$, $S_2$ and the output signal of the third majority function logic circuit at any modulation cycle is given by the relation:

$$Q^{n+3}=[[Q_1^{n}, \bar{R}_1^{n}, S_1^{n}], \bar{R}_2^{n+}{}_1, S_2^{n+1}]\bar{R}_3^{n+2}, S^{n+2}]$$

where $Q_1^n$ is stored signal, $S_1^n$ and $\bar{R}_1^n$ are the independent input signals to the first logic circuit in true and complement form, respectively; $S_2^{n+1}$ and $\bar{R}_2^{n+1}$ are the independent input signals to the second logic circuit in true and complement form, respectively; $S_3^{n+2}$ and $\bar{R}_3^{n+2}$ are the independent input signals to the third logic circuit in true and complement form, respectively; *n* is an integer designating the modulation phase of the three phase carrier and the brackets designate the majority function.

References Cited by the Examiner

UNITED STATES PATENTS

| | | | |
|---|---|---|---|
| 2,815,448 | 12/1957 | Von Neuman | 307—88 |
| 2,948,818 | 8/1960 | Goto | 307—88 |
| 2,992,398 | 7/1961 | Sterzer | 307—88 |
| 3,011,706 | 12/1961 | Goto | 307—88 |
| 3,051,844 | 8/1962 | Beam et al. | 307—88 |
| 3,108,193 | 10/1963 | Schreiner | 307—88 |

OTHER REFERENCES

Publication I: 1959, Proceedings of the Eastern Joint Computer Conference, pages 38 to 47, Dec. 1 and 3, 1959.

IRVING L. SRAGOW, *Primary Examiner.*

R. R. HUBBARD, H. D. VOLK, *Assistant Examiners.*